US012488103B2

(12) United States Patent
Dambra et al.

(10) Patent No.: US 12,488,103 B2
(45) Date of Patent: Dec. 2, 2025

(54) PROTECTING AGAINST MALICIOUS APPLICATION ENCOUNTERS ON MOBILE DEVICES

(71) Applicant: Gen Digital Inc., Tempe, AZ (US)

(72) Inventors: Savino Dambra, Nice (FR); Platon Kotzias, Athens (GR); Leylya Yumer, Antibes (FR)

(73) Assignee: GEN DIGITAL, INC., Tempe, AZ (US)

( * ) Notice: Subject to any disclaimer, the term of this patent is extended or adjusted under 35 U.S.C. 154(b) by 94 days.

(21) Appl. No.: 18/462,809

(22) Filed: Sep. 7, 2023

(65) Prior Publication Data

US 2025/0077660 A1    Mar. 6, 2025

(30) Foreign Application Priority Data

Aug. 30, 2023  (EP) .................................. 23386081

(51) Int. Cl.
| | |
|---|---|
| H04L 29/00 | (2006.01) |
| G06F 21/55 | (2013.01) |
| G06F 21/56 | (2013.01) |
| H04L 9/40 | (2022.01) |

(52) U.S. Cl.
CPC ............ *G06F 21/554* (2013.01); *G06F 21/56* (2013.01); *H04L 63/20* (2013.01)

(58) Field of Classification Search
CPC ......... G06F 21/554; G06F 21/56; H04L 63/20
See application file for complete search history.

(56) References Cited

U.S. PATENT DOCUMENTS

| | | | | |
|---|---|---|---|---|
| 7,584,508 B1 * | 9/2009 | Kashchenko | ......... | G06F 21/577 726/25 |
| 7,607,174 B1 * | 10/2009 | Kashchenko | ........... | G06F 21/74 726/25 |
| 7,665,125 B2 * | 2/2010 | Heard | .................... | H04W 12/37 713/170 |
| 9,386,027 B2 * | 7/2016 | Xing | .................... | H04W 12/128 |
| 9,661,023 B1 * | 5/2017 | Fang | ..................... | G06F 21/577 |
| 10,079,876 B1 * | 9/2018 | Chung | .................. | H04W 12/08 |

(Continued)

OTHER PUBLICATIONS

How much time does the average American spend on their phone in 2021, 2021. https://techjury.net/blog/how-much-time-does-theaverage-american-spend-on-their-phone/.

(Continued)

*Primary Examiner* — Don G Zhao
(74) *Attorney, Agent, or Firm* — MASCHOFF BRENNAN

(57) ABSTRACT

Methods and systems for protecting mobile devices from malicious application encounters are disclosed. In one embodiment, a method may include obtaining application data and feature data from a plurality of mobile devices and identifying one or more malicious applications installed thereon. Based on the application data, a user profile for each mobile device may be determined and each mobile device may be assigned to a cluster based on the user profile identified. A security model based on the featured data may be created for a selected cluster and the security model may be applied to a selected mobile device within the selected cluster. Finally, a security action may be performed on the selected mobile device based on an output of the security model.

20 Claims, 8 Drawing Sheets

(56) References Cited

U.S. PATENT DOCUMENTS

| | | | | |
|---|---|---|---|---|
| 10,181,033 | B2* | 1/2019 | Yan | G06F 21/56 |
| 10,929,532 | B1* | 2/2021 | Margaritelli | G06N 20/00 |
| 11,593,478 | B2* | 2/2023 | Ekambaram | G06F 21/554 |
| 11,683,692 | B1* | 6/2023 | Shen | H04W 12/37 |
| | | | | 455/410 |
| 2003/0081621 | A1* | 5/2003 | Godfrey | H04L 67/10 |
| | | | | 370/400 |
| 2006/0112427 | A1* | 5/2006 | Shahbazi | H04W 12/086 |
| | | | | 726/16 |
| 2009/0287921 | A1* | 11/2009 | Zhu | G06Q 10/02 |
| | | | | 713/155 |
| 2010/0154049 | A1* | 6/2010 | Yoshimi | H04L 63/02 |
| | | | | 726/13 |
| 2011/0289308 | A1* | 11/2011 | Sobko | G06F 21/56 |
| | | | | 709/204 |
| 2012/0110174 | A1* | 5/2012 | Wootton | H04L 63/1416 |
| | | | | 709/224 |
| 2012/0240236 | A1* | 9/2012 | Wyatt | G06F 21/10 |
| | | | | 726/25 |
| 2013/0097706 | A1* | 4/2013 | Titonis | G06F 21/566 |
| | | | | 726/22 |
| 2013/0283377 | A1* | 10/2013 | Das | G06F 21/51 |
| | | | | 726/23 |
| 2013/0347094 | A1* | 12/2013 | Bettini | H04L 63/1433 |
| | | | | 726/11 |
| 2014/0113588 | A1* | 4/2014 | Chekina | G06N 20/00 |
| | | | | 455/410 |
| 2014/0258128 | A1* | 9/2014 | Lei | H04M 15/43 |
| | | | | 705/44 |
| 2014/0321646 | A1* | 10/2014 | Ksontini | H04W 4/60 |
| | | | | 380/247 |
| 2016/0006753 | A1* | 1/2016 | McDaid | H04W 12/128 |
| | | | | 726/23 |
| 2016/0099963 | A1* | 4/2016 | Mahaffey | H04L 63/166 |
| | | | | 726/25 |
| 2017/0004524 | A1* | 1/2017 | Ma | G06Q 30/0267 |
| 2017/0206353 | A1* | 7/2017 | Jai | G06F 21/565 |
| 2018/0018459 | A1* | 1/2018 | Zhang | G06F 21/566 |
| 2018/0239929 | A1* | 8/2018 | Shell | G06F 9/4406 |
| 2018/0255102 | A1* | 9/2018 | Ward | H04L 63/20 |
| 2019/0014468 | A1* | 1/2019 | Votaw | G06Q 20/1085 |
| 2019/0089740 | A1* | 3/2019 | Hastings | H04L 63/0245 |
| 2019/0238582 | A1* | 8/2019 | Sauve | H04L 63/1433 |
| 2019/0253455 | A1* | 8/2019 | Xuan | H04L 41/0893 |
| 2019/0258805 | A1* | 8/2019 | Elovici | G06F 11/261 |
| 2019/0349350 | A1* | 11/2019 | Valites | G06F 21/6245 |
| 2020/0092334 | A1* | 3/2020 | Hiebert | H04L 41/0813 |
| 2020/0162472 | A1* | 5/2020 | Zadeh | G06F 9/44505 |
| 2020/0204576 | A1* | 6/2020 | Davis | H04L 63/20 |
| 2020/0285752 | A1* | 9/2020 | Wyatt | G06F 21/566 |
| 2020/0356994 | A1* | 11/2020 | Rao | G06Q 50/01 |
| 2021/0158182 | A1* | 5/2021 | Duvvuri | G06F 16/285 |
| 2021/0258315 | A1* | 8/2021 | Dunjic | H04L 63/105 |
| 2022/0182400 | A1* | 6/2022 | Sikder | G06N 7/01 |
| 2023/0030341 | A1* | 2/2023 | Koh | G06F 40/186 |
| 2023/0078704 | A1* | 3/2023 | Sun | G06F 21/6227 |
| | | | | 713/171 |
| 2023/0308485 | A1* | 9/2023 | Jones | H04L 63/105 |
| 2025/0077660 | A1* | 3/2025 | Dambra | G06F 21/56 |

OTHER PUBLICATIONS

Syed Ishtiaque Ahmed, Md Romael Haque, Irtaza Haider, Jay Chen, and Nicola Dell. "Everyone Has Some Personal Stuff": Designing to Support Digital Privacy with Shared Mobile Phone Use in Bangladesh. In Proceedings of the 2019 CHI Conference on Human Factors in Computing Systems, pp. 1-13, 2019.

Syed Ishtiaque Ahmed, Steven J Jackson, Maruf Zaber, Mehrab Bin Morshed, Md Habibullah Bin Ismail, and Sharmin Afrose. "Ecologies of use and design: individual and social practices of mobile phone use within low-literate rickshawpuller communities in urban Bangladesh". In Proceedings of the 4th Annual Symposium on Computing for Development, pp. 1-10, 2013.

Taslima Akter, Bryan Dosono, Tousif Ahmed, Apu Kapadia, and Bryan Semaan. "i am uncomfortable sharing what i can't see: Privacy concerns of the visually impaired with camera based assistive applications". In Usenix Security Symposium, 2020.

Mahdi Nasrullah Al-Ameen, Huzeyfe Kocabas, Swapnil Nandy, and Tanjina Tamanna. "We, three brothers have always known everything of each other": A Crosscultural Study of Sharing Digital Devices and Online Accounts. Proceedings on Privacy Enhancing Technologies, 2021(4):203-224, 2021.

Leyla Bilge, Yufei Han, and Matteo Dell'Amico. Riskteller: Predicting the risk of cyber incidents. In ACM SIGSAC Conference on Computer and Communications Security, 2017.

Eduardo Blázquez, Sergio Pastrana, Álvaro Feal, Julien Gamba, Platon Kotzias, Narseo Vallina-Rodriguez, and Juan Tapiador. Trouble over-the-air: An analysis of fota apps in the android ecosystem. In IEEE Symposium on Security and Privacy (SP), 2021.

Susanne Bødker and Ellen Christiansen. Poetry in motion: appropriation of the world of apps. In Proceedings of the 30th European conference on cognitive ergonomics, pp. 78-84, 2012.

Marcus Botacin, Hojjat Aghakhani, Stefano Ortolani, Christopher Kruegel, Giovanni Vigna, Daniela Oliveira, Paulo Lício De Geus, and André Grégio. One size does not fit all: a longitudinal analysis of brazilian financial malware. ACM Transactions on Privacy and Security (TOPS), 24(2):1-31, 2021.

Juan Caballero, Chris Grier, Christian Kreibich, and Vern Paxson. Measuring Pay-per-Install: The Commoditization of Malware Distribution. In Usenix Security Symposium, 2011.

Davide Canali, Leyla Bilge, and Davide Balzarotti. On the effectiveness of risk prediction based on users browsing behavior. In Proceedings of the 9th ACM symposium on Information, computer and communications security, pp. 171-182, 2014.

Rahul Chatterjee, Periwinkle Doerfler, Hadas Orgad, Sam Havron, Jackeline Palmer, Diana Freed, Karen Levy, Nicola Dell, Damon McCoy, and Thomas Ristenpart. The spyware used in intimate partner violence. In IEEE Symposium on Security and Privacy, 2018.

Christine Chen, Nicola Dell, and Franziska Roesner. Computer security and privacy in the interactions between victim service providers and human trafficking survivors. In Usenix Security Symposium, 2019.

Sunny Consolvo, Patrick Kelley, Tara Matthews, Kurt Thomas, Lee Dunn, and Elie Bursztein. "why wouldn't someone think of democracy as a target?": Security practices & challenges of people involved with u.s. political campaigns. In Usenix Security Symposium, 2021.

Savino Dambra, Leyla Bilge, Platon Kotzias, Yun Shen, and Juan Caballero. One size does not fit all: Quantifying the risk of malicious app encounters for different android user profiles. arXiv preprint arXiv:2301.07346, 2023.

Trinh Minh Tri Do, Jan Blom, and Daniel Gatica-Perez. Smartphone usage in the wild: a large-scale analysis of applications and context. In Proceedings of the 13th international conference on multimodal interfaces, pp. 353-360, 2011.

Kasra EdalatNejad, Wouter Lueks, Julien Pierre Martin, Soline Ledesert, Anne L'Hôte, Bruno Thomas, Laurent Girod, and Carmela Troncoso. Datasharenetwork: A decentralized privacy-preserving search engine for investigative journalists. In Usenix Security Symposium, 2020.

Diana Freed, Sam Havron, Emily Tseng, Andrea Gallardo, Rahul Chatterjee, Thomas Ristenpart, and Nicola Dell. "is my phone hacked?" analyzing clinical computer security interventions with survivors of intimate partner violence. Proc. ACM Hum.-Comput. Interact., 3(CSCW), Nov. 2019.

Alisa Frik, Leysan Nurgalieva, Julia Bernd, Joyce Lee, Florian Schaub, and Serge Egelman. Privacy and security threat models and mitigation strategies of older adults. In Symposium on Usable Privacy and Security, 2019.

Julien Gamba, Mohammed Rashed, Abbas Razaghpanah, Juan Tapiador, and N. Vallina-Rodriguez. An analysis of pre-installed android software. In IEEE Symposium on Security and Privacy, 2020.

(56) References Cited

OTHER PUBLICATIONS

Yusong Gao, He Li, and Tingshao Zhu. Predicting subjective well-being by smartphone usage behaviors. In Healthinf, pp. 317-322, 2014.
Arup Kumar Ghosh, Charles E. Hughes, and Pamela J. Wisniewski. Circle of Trust: A New Approach to Mobile Online Safety for Families. 2020.
Tamy Guberek, Allison McDonald, Sylvia Simioni, Abraham H. Mhaidli, Kentaro Toyama, and Florian Schaub. Keeping a Low Profile? Technology, Risk and Privacy among Undocumented Immigrants. 2018.
Marian Harbach, Markus Hettig, Susanne Weber, and Matthew Smith. Using personal examples to improve risk communication for security & privacy decisions. In Proceedings of the SIGCHI conference on human factors in computing systems, pp. 2647-2656, 2014.
Platon Kotzias, Leyla Bilge, and Juan Caballero. Measuring PUP Prevalence and PUP Distribution through Pay-Per-Install Services. In Usenix Security Symposium, 2016.
Platon Kotzias, Leyla Bilge, Pierre-Antoine Vervier, and Juan Caballero. Mind your Own Business: A Longitudinal Study of Threats and Vulnerabilities in Enterprises. In Network and Distributed Systems Security Symposium, 2019.
Platon Kotzias, Juan Caballero, and Leyla Bilge. How Did That Get in My Phone? Unwanted App Distribution on Android Devices. In Proceedings of the 42nd IEEE Symposium on Security and Privacy, 2021.
Platon Kotzias, Srdjan Matic, Richard Rivera, and Juan Caballero. Certified PUP: Abuse in Authenticode Code Signing. In ACM Conference on Computer and Communication Security, 2015.
Kat Krol, Matthew Moroz, and M Angela Sasse. Don't work. can't work? why it's time to rethink security warnings. In 2012 7th international conference on risks and security of internet and systems (CRISIS), pp. 1-8. IEEE, 2012.
Elmer Lastdrager, Inés Carvajal Gallardo, Pieter Hartel, and Marianne Junger. How effective is anti-phishing training for children? In Usenix Conference on Usable Privacy and Security, 2017.
Bin Liu, Mads Schaarup Andersen, Florian Schaub, Hazim Almuhimedi, Shikun Aerin Zhang, Norman Sadeh, Yuvraj Agarwal, and Alessandro Acquisti. Follow my recommendations: A personalized privacy assistant for mobile app permissions. In Twelfth symposium on usable privacy and security (SOUPS 2016), pp. 27-41, 2016.
Yang Liu, Armin Sarabi, Jing Zhang, Parinaz Naghizadeh, Manish Karir, Michael Bailey, and Mingyan Liu. Cloudy with a chance of breach: Forecasting cyber security incidents. In 24th fUSENIXg Security Symposium (fUSENIXg Security 15), pp. 1009-1024, 2015.
Tara Matthews, Kerwell Liao, Anna Turner, Marianne Berkovich, Robert Reeder, and Sunny Consolvo. "She'll just grab any device that's closer": A Study of Everyday Device & Account Sharing in Households. In Proceedings of the 2016 CHI Conference on Human Factors in Computing Systems, pp. 5921-5932, 2016.
Susan E. McGregor, Polina Charters, Tobin Holliday, and Franziska Roesner. Investigating the computer security practices and needs of journalists. In Usenix Security Symposium, 2015.
Ghita Mezzour, Kathleen M Carley, and L Richard Carley. An empirical study of global malware encounters. In Symposium and Bootcamp on the Science of Security, 2015.
Rachel Gibson M.S. Countering tech abuse together, 2019. https://www:virusbulletin:com/uploads/pdf/conference_slides/2019/VB2019-ZakorzhevskyG:pdf.
Antonio Nappa, Richard Johnson, Leyla Bilge, Juan Caballero, and Tudor Dimitras. The Attack of the Clones: A Study of the Impact of Shared Code on Vulnerability Patching. In IEEE Symposium on Security and Privacy, 2015.
NortonLifeLock. Nortonlifelock global privacy statement. https:www:nortonlifelock:com/us/en/privacy/global-privacy-statement/, 2021.
Jake Reichel, Fleming Peck, Mikako Inaba, Bisrat Moges, Brahmnoor Singh Chawla, and Marshini Chetty. 'I Have Too Much Respect for My Elders': Understanding South African Mobile Users' Perceptions of Privacy and Current Behaviors on Facebook and WhatsApp. Usenix Association, USA, 2020.
Kevin A Roundy, Paula Barmaimon Mendelberg, Nicola Dell, Damon McCoy, Daniel Nissani, Thomas Ristenpart, and Acar Tamersoy. The many kinds of creepware used for interpersonal attacks. In IEEE Symposium on Security and Privacy, 2020.
Nithya Sambasivan, Garen Checkley, Amna Batool, Nova Ahmed, David Nemer, Laura Sanely Gaytán-Lugo, Tara Matthews, Sunny Consolvo, and Elizabeth Churchill. "Privacy is not for me, it's for those rich women": Performative Privacy Practices on Mobile Phones by Women in South Asia. In Fourteenth Symposium on Usable Privacy and Security (SOUPS 2018), pp. 127-142, 2018.
Marcos Sebastian, Richard Rivera, Platon Kotzias, and Juan Caballero. Avclass: A tool for massive malware labeling. In Research in Attacks, Intrusions, and Defenses, 2016.
Suranga Seneviratne, Aruna Seneviratne, Prasant Mohapatra, and Anirban Mahanti. Predicting user traits from a snapshot of apps installed on a smartphone. ACM SIGMOBILE Mobile Computing and Communications Review, 18(2):1-8, 2014.
Suranga Seneviratne, Aruna Seneviratne, Prasant Mohapatra, and Anirban Mahanti. Your installed apps reveal your gender and more! ACM SIGMOBILE Mobile Computing and Communications Review, 18(3):55-61, 2015.
Mahmood Sharif, Jumpei Urakawa, Nicolas Christin, Ayumu Kubota, and Akira Yamada. Predicting impending exposure to malicious content from user behavior. In Proceedings of the 2018 ACM SIGSAC Conference on Computer and Communications Security, 2018.
Yun Shen and Gianluca Stringhini. Andruspex: Leveraging graph representation learning to predict harmful app installations on mobile devices. arXiv preprint arXiv:2103.05476, 2021.
Yun Shen, Pierre-Antoine Vervier, and Gianluca Stringhini. A Large-scale Temporal Measurement of Android Malicious Apps: Persistence, Migration, and Lessons Learned. In 31st Usenix Security Symposium (Usenix Security 22), pp. 1167-1184, 2022.
Camelia Simoiu, Ali Zand, Kurt Thomas, and Elie Bursztein. Who is targeted by email-based phishing and malware? measuring factors that differentiate risk. In Proceedings of the ACM Internet Measurement Conference, pp. 567-576, 2020.
Manya Sleeper, Tara Matthews, Kathleen O'Leary, Anna Turner, Jill Palzkill Woelfer, Martin Shelton, Andrew Oplinger, Andreas Schou, and Sunny Consolvo. Tough times at transitional homeless shelters: Considering the impact of financial insecurity on digital security and privacy. In Proceedings of the 2019 CHI Conference on Human Factors in Computing Systems, 2019.
Olivier Thonnard, Leyla Bilge, Anand Kashyap, and Martin Lee. Are you at risk? profiling organizations and individuals subject to targeted attacks. In Rainer Böhme and Tatsuaki Okamoto, editors, Financial Cryptography and Data Security, pp. 13-31, Berlin, Heidelberg, 2015. Springer Berlin Heidelberg.
Rolf van Wegberg, Fieke Miedema, Ugur Akyazi, Arman Noroozian, Bram Klievink, and Michel van Eeten. Go see a specialist? predicting cybercrime sales on online anonymous markets from vendor and product characteristics. In Proceedings of The Web Conference 2020, pp. 816-826, 2020.
Jessica Vitak, Yuting Liao, Mega Subramaniam, and Priya Kumar. I knew it was too good to be true: The challenges economically disadvantaged internet users face in assessing trustworthiness, avoiding scams, and developing self-efficacy online. Proc. ACM Hum.-Comput. Interact., 2(CSCW), Nov. 2018.
Ashley Marie Walker, Yaxing Yao, Christine Geeng, Roberto Hoyle, and Pamela Wisniewski. Moving beyond 'one size fits all': Research considerations for working with vulnerable populations. Interactions, 26(6):34-39, Oct. 2019.
Haoyu Wang, Junjun Si, Hao Li, and Yao Guo. Rmvdroid: towards a reliable android malware dataset with app metadata. In 2019 IEEE/ACM 16th International Conference on Mining Software Repositories (MSR), pp. 404-408. IEEE, 2019.
Noel Warford, Tara Matthews, Kaitlyn Yang, Omer Akgul, Sunny Consolvo, Patrick Gage Kelley, Nathan Malkin, Michelle L Mazurek, Manya Sleeper, and Kurt Thomas. Sok: A framework for unifying

(56) References Cited

OTHER PUBLICATIONS at-risk user research. In 2022 IEEE Symposium on Security and Privacy (SP), pp. 2344-2360. IEEE, 2022.
Pamela Wisniewski, Heng Xu, Mary Beth Rosson, Daniel F. Perkins, and John M. Carroll. Dear diary: Teens reflect on their weekly online risk experiences. In CHI Conference on Human Factors in Computing Systems, 2016.
Pamela J Wisniewski, Bart P Knijnenburg, and Heather Richter Lipford. Making privacy personal: Profiling social network users to inform privacy education and nudging. International Journal of human-computer studies, 98:95-108, 2017.
Ting-Fang Yen, Victor Heorhiadi, Alina Oprea, Michael K Reiter, and Ari Juels. An Epidemiological Study of Malware Encounters in a Large Enterprise. In ACM Conference on Computer and Communications Security, 2014.
Josh Jia-Ching Ying, Yao-Jen Chang, Chi-Min Huang, and Vincent S Tseng. Demographic prediction based on users mobile behaviors. Mobile Data Challenge, 2012:1-4, 2012.
Sha Zhao, Shijian Li, Julian Ramos, Zhiling Luo, Ziwen Jiang, Anind K Dey, and Gang Pan. User profiling from their use of smartphone applications: A survey. Pervasive and Mobile Computing, p. 101052, 2019.
Sha Zhao, Gang Pan, Yifan Zhao, Jianrong Tao, Jinlai Chen, Shijian Li, and Zhaohui Wu. Mining user attributes using large-scale app lists of smartphones. IEEE Systems Journal, 11(1):315-323, 2016.
Sha Zhao, Yizhi Xu, Xiaojuan Ma, Ziwen Jiang, Zhiling Luo, Shijian Li, Laurence Tianruo Yang, Anind Dey, and Gang Pan. Gender profiling from a single snapshot of apps installed on a smartphone: An empirical study. IEEE Transactions on Industrial Informatics, 2019.
Shuofei Zhu, Jianjun Shi, Limin Yang, Boqin Qin, Ziyi Zhang, Linhai Song, and Gang Wang. Measuring and Modeling the Label Dynamics of Online Anti-Malware Engines. In Usenix Security Symposium, 2020.
Dambra, Savino et al.; One Size Does not Fit All: Quantifying the Risk of Malicious App Encounters for Different Android User Profiles; Presented at the Proceedings of the 32nd Usenix Security Symposium; Aug. 9-11, 2023; 19 pages.
A Colin Cameron and Pravin K Trivedi. Regression analysis of count data, Second Edition; vol. 53. Cambridge University Press, 2013.
Chakajkla Jesdabodi and Walid Maalej. Understanding usage states on mobile devices. In Proceedings of the 2015 ACM international joint conference on pervasive and ubiquitous computing, pp. 1221-1225, 2015.
Laura L Murphy and Alexandra E Priebe. "My co-wife can borrow my mobile phone!" Gendered Geographies of Cell Phone Usage and Significance for Rural Kenyans. Gender, Technology and Development, 15(1):1-23, 2011.
Haoyu Wang, Hao Li, Li Li, Yao Guo, and Guoai Xu. Why are Android Apps Removed from Google Play? A Large-Scale Empirical Study. In IEEE/ACM International Conference on Mining Software Repositories, 2018.

* cited by examiner

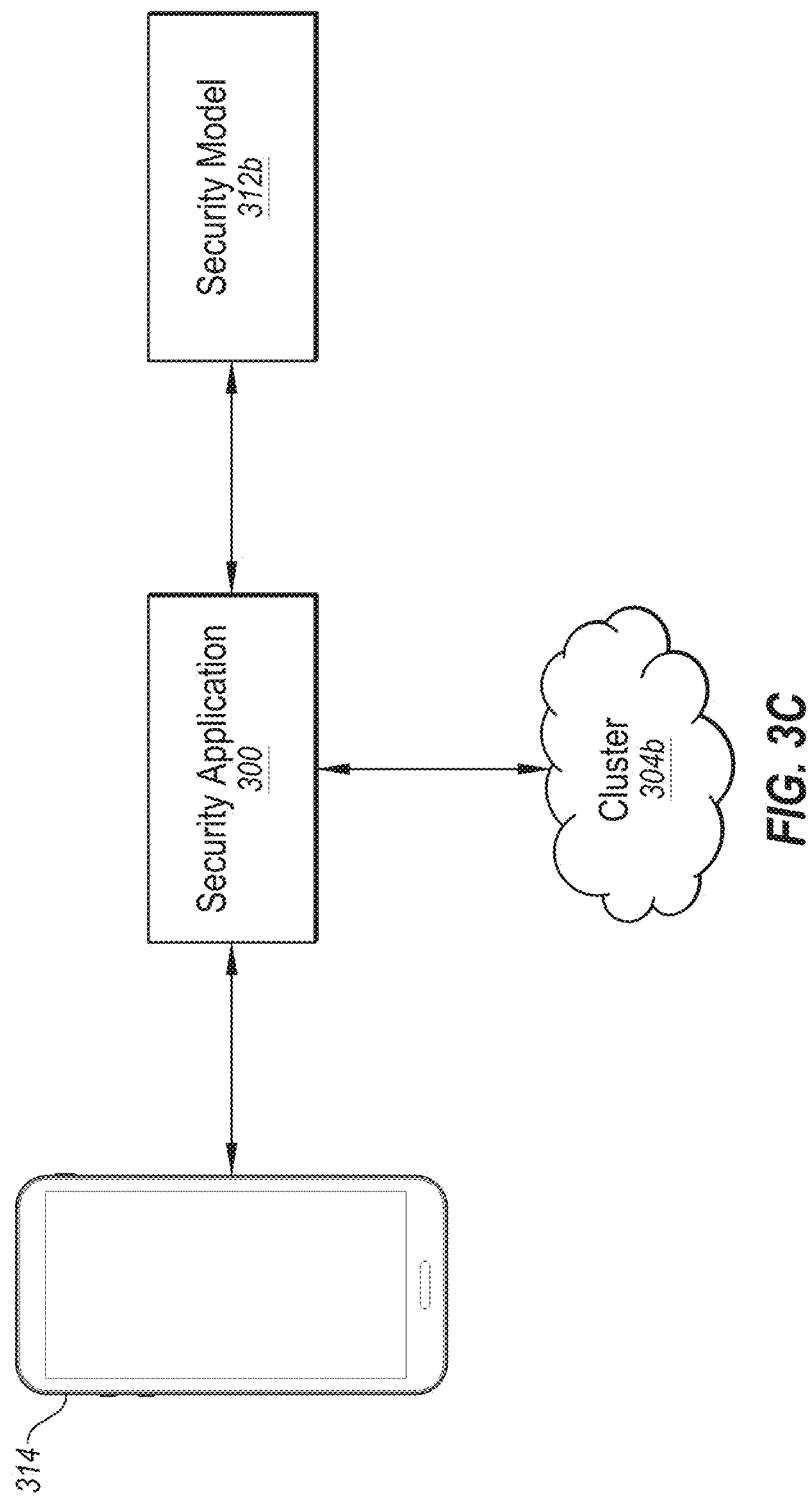

PROTECTING AGAINST MALICIOUS APPLICATION ENCOUNTERS ON MOBILE DEVICES

BACKGROUND

Antivirus (AV) solutions for desktop computers operate in a reactive fashion. The AV sensor installed on the machine often silently monitors executed binaries, network traffic, machine memory, and newly generated files looking for malicious signatures or behaviors. If a malicious pattern is matched, the software has the capability to not only provide a warning to the user, but also to react by removing the malicious file and neutralizing the threat. This reactive approach is possible because desktop operating systems allow AV solutions to perform privileged operations on other pieces of software after the users have granted such permission.

Such a scenario is different in the mobile ecosystem. Mobile AV solutions are often not able to react when malicious files are discovered. Thus, while AV solutions for mobile devices can identify malicious files and recommend removal to neutralize the threat, they are often prevented from performing the actual act of file removal. This is because many mobile operating systems only allow the users to manually perform such an action. Removing a malicious file is thus left to the user. Unfortunately, users often put off or ignore altogether warnings provided by their mobile AV solution. Indeed, according to one study, the average time for a user to remove a file—after being notified that the file is malicious—is more than 3 weeks.

Therefore, implementing a proactive approach that accurately predicts threats that are likely to be encountered on a mobile device is essential for mobile AV solutions. The ability to perform a security action before users install a malicious application or when they are undertaking risky behaviors can prevent the most common threats and safeguard the mobile device. A model that can predict such circumstances before they materialize is therefore required to be able to enact proactive protection for mobile users.

The subject matter claimed herein is not limited to embodiments that solve any disadvantages or that operate only in environments such as those described above. Rather, this background is only provided to illustrate one example technology area where some embodiments described herein may be practiced.

SUMMARY

In one embodiment, a computer-implemented method for protecting mobile devices from malicious application encounters may be performed, at least in part, by a computing device including one or more processors. The method may include (a) obtaining application data and feature data from a plurality of mobile devices, (b) identifying one or more malicious applications installed on each mobile device within the plurality of mobile devices, (c) determining, based on the application data, a user profile for each mobile device within the plurality of mobile devices, (d) assigning each mobile device within the plurality of mobile devices to a cluster based on the user profile identified for each mobile device within the plurality of mobile devices, (e) creating, based on the feature data, a security model for a selected cluster, wherein the feature data relates to one or more feature classes from a subset of mobile devices assigned to the selected cluster, (f) applying the security model to a selected mobile device within the selected cluster, and (g) performing a security action on the selected mobile device based on an output of the security model.

In some embodiments, the application data may include an identification of the applications installed on each mobile device within the plurality of mobile devices.

In some embodiments, malicious applications may include applications that install malware.

In some embodiments, the one or more feature classes include volume, diversity, updates, distribution, prevalence, or geography. In these embodiments, the feature data may relate to a volume of online activity by each mobile device within the subset of mobile devices and/or a diversity of online behaviors by each mobile device within the subset of mobile devices. In addition or alternatively, the feature data may relate to a number or frequency of software updates performed by each mobile device within the subset of mobile devices and/or a distribution of application signers or application categories by each mobile device within the subset of mobile devices. In addition or alternatively, the feature data may relate to a prevalence of applications installed by each mobile device within the subset of mobile devices and/or a geographical location of each mobile device within the subset of mobile devices.

In some embodiments, the security action may include providing recommendations for antivirus default settings on the selected mobile device and/or automatically adjusting antivirus default settings on the selected mobile device and/or increasing a scan level intensity on the selected mobile device.

In some embodiments, one or more non-transitory computer-readable media may comprise one or more computer-readable instructions that, when executed by one or more processors of a computing device, cause the computing device to perform a method for protecting mobile devices from malicious application encounters.

In some embodiments, a computing device comprising one or more processors and one or more non-transitory computer-readable media comprising one or more computer-readable instructions that, when executed by the one or more processors, may cause the computing device to perform a method for protecting mobile devices from malicious application encounters.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings, in which:

FIGS. 3A-3C illustrate different stages of actions performed by a security application in a system for protecting mobile devices from malicious application encounters;

DETAILED DESCRIPTION

Due to limitations in their operating systems, antivirus (AV) solutions on mobile devices are often not able to actively remove files that they identify as malicious from the mobile devices on which they operate. These AV solutions are limited to providing warnings to users and recommending that the users remove the malicious files discovered. Unfortunately, users often put off or ignore altogether warnings that are provided by their mobile AV solutions. Indeed, according to one study, the average time for a user to remove a file—after being notified that the file is malicious—is more than 3 weeks.

Thus, implementing a proactive approach that accurately predicts threats that are likely to be encountered on a mobile device is essential for mobile AV solutions. The ability to perform a security action before users install a malicious application or when they are undertaking a risky behavior can prevent the most common threats and safeguard the mobile device. A security model that can predict such circumstances before they materialize is therefore essential to proactively protect mobile users.

Accurately predicting the types of threats that users are likely to encounter on mobile devices is difficult because threats encountered on mobile devices vary widely from user to user. Thus, mobile device AV solutions that are configured to train a security model on a single, general class of mobile device users, ignores the differences and needs of distinct user communities. These "one-size-fits-all" security models trained on single classes of mobile device users are unreliable to accurately predict threats that may be common in one community of mobile device users, but uncommon in another. Therefore, categorizing mobile device users into clusters based on similarities in user profiles, and creating different security models for each cluster, can dramatically improve the accuracy and reliability of threat predictions compared to one-size-fits-all security models.

Some embodiments disclosed herein may enable protecting mobile devices from malicious application encounters. In particular, some embodiments may obtain application data and feature data from a plurality of mobile devices and identify one or more malicious applications installed on each mobile device within the plurality of mobile devices. A user profile for each mobile device may be determined based on the application data and each mobile device may be assigned to a cluster based on the user profile identified. A security model may be created for a selected cluster and applied to a selected mobile device within the selected cluster. Finally, a security action may be performed on the selected mobile device based on an output of the security model.

Figure 1:
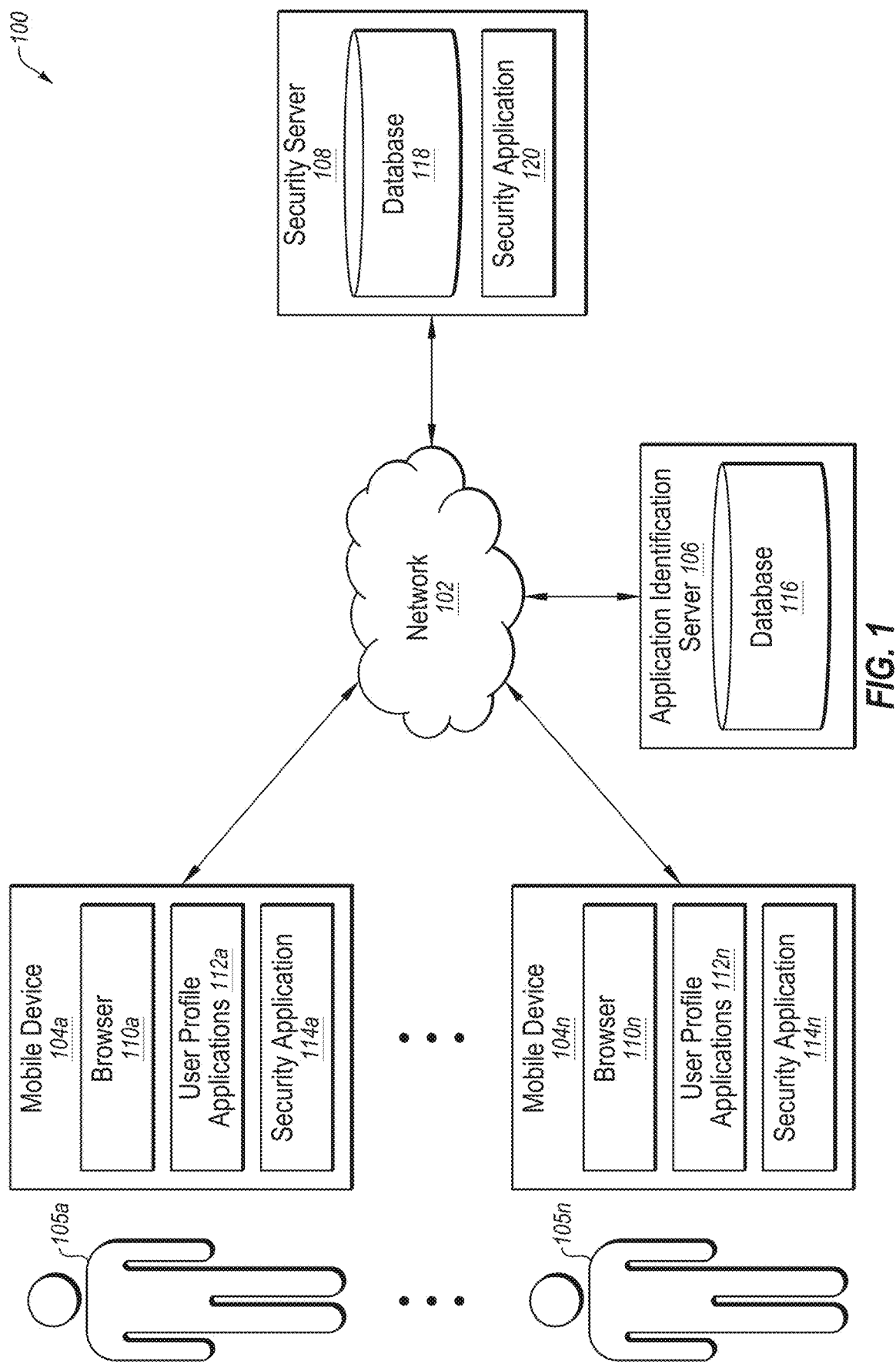
FIG. 1 illustrates an example system configured for protecting mobile devices from malicious application encounters.

Turning to the figures, FIG. 1 illustrates an example system 100 configured for protecting mobile devices from malicious application encounters. The system 100 may include a network 102, mobile devices 104a-104n and associated users 105a-105n, an application identification server 106, and a security server 108.

In some embodiments, the network 102 may be configured to communicatively couple the mobile devices 104a-104n, the application identification server 106, and the security server 108. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), a cellular network, the Internet, or some combination thereof.

Figure 5:
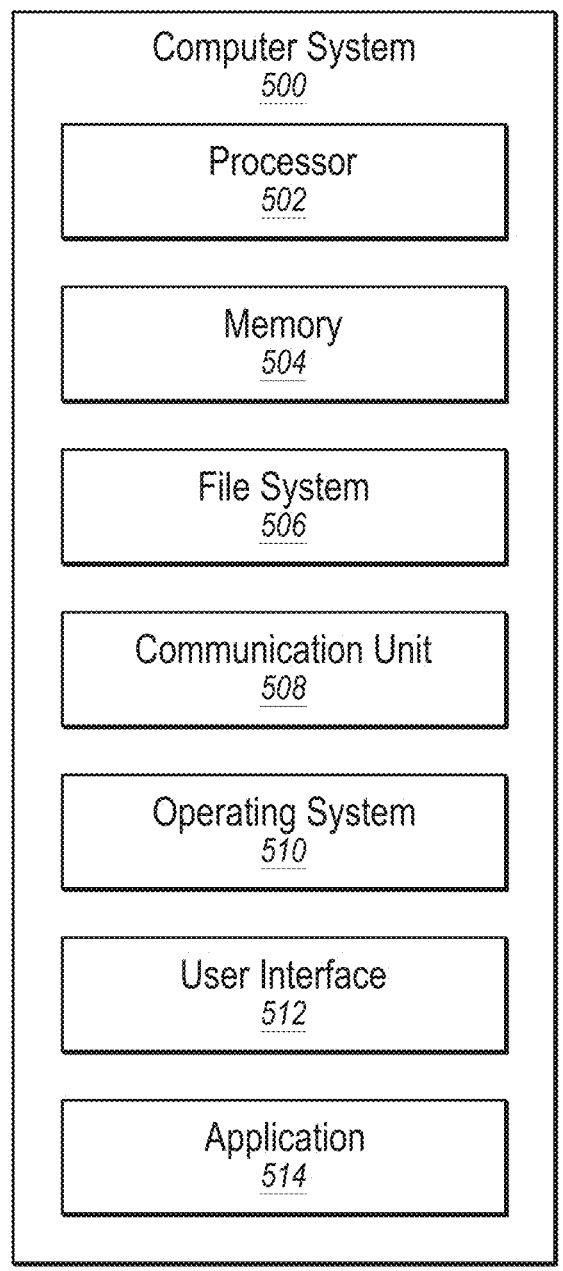
FIG. 5 illustrates an example computer system that may be employed in protecting mobile devices from malicious application encounters.

In some embodiments, the mobile devices 104a-104n may be any computer systems capable of communicating over the network 102 and installing and running applications downloaded from the network 102, examples of which are disclosed herein in connection with the computer system 500 of FIG. 5. The mobile devices 104a-104n include browsers 110a-110n for accessing servers over the network 102. In addition, the mobile devices 104a-104n include user profile applications 112a-112n, which may be used to identify user profiles for the mobile devices 104a-104n. Being portable, mobile devices are typically kept close to their users throughout their daily routines and have become an indispensable accessory for many activities such as getting informed, listening to music, consuming video content, creating art, booking travel, and ordering food. Users install a wealth of applications on their mobile devices to enable these activities. As such, user profiles that are indicative of a user's interests, needs, and personality traits, etc., can be created based on the applications installed on a mobile device.

The mobile devices 104a-104n also include security applications 114a-114n. As provided in more detail hereafter, the security applications 114a-114n may perform functions for protecting the mobile devices 104a-104n against encounters with malicious applications.

In some embodiments, the application identification server 106 may be any computer system capable of communicating over the network 102, examples of which are disclosed herein in connection with the computer system 500 of FIG. 5. The application identification server 106 may provide access, over the network 102, to a database 116 that identifies applications as malicious or safe. According to the present disclosure, an application may be identified as malicious if the application comprises malware or a potentially unwanted application (PUA).

In some embodiments, the security server 108 may be any computer system capable of communicating over the network 102, examples of which are disclosed herein in connection with the computer system 500 of FIG. 5. The security server 108 includes a database 118 and a security application 120. The database 118 may store data received from mobile devices 104a-104n. Similar to the security applications 114a-114n, the security application 120 may perform functions to protect the mobile devices 104a-104n against malicious application encounters.

Specifically, one or more of the security applications 114a-114n and 120 may determine a user profile for each of the mobile devices 104a-104n based on data associated with or features extracted from the user profile applications 112a-112n, which may be received from the mobile devices 104a-104n and stored in the databased 118. The user profile applications 112a-112n may include some or all of the applications that have been installed on the mobile devices 104a-104n. In some embodiments, certain applications installed on the mobile devices 104a-104n may not be included within the user profile applications 112a-112n. These excluded applications, which may include operating system applications and pre-installed applications, may be excluded from the user profile applications 112a-112n because they are not rooted on a decision by one of users 105a-105n to install and thus should not be used to determine user profiles for the mobile devices 104a-104n.

Once a user profile has been determined for each of the mobile devices 104a-104n, one or more of the security applications 114a-114n and 120 may assign each of the mobile devices 104a-104n to a cluster. The cluster to which each of the mobile devices 104a-104n is assigned may be based on the user profile associated with each of the mobile devices 104a-104n. Thus, mobile devices having the same user profile may be assigned to the same cluster. These clusters, and the subset of mobile devices 104a-104n that are assigned to each cluster, may also be stored in the database 118.

In addition to determining user profiles and assigning the mobile devices 104a-104n into clusters, one or more of the security applications 114a-114n and 120 may also identify whether the applications installed on the mobile devices 104a-104n, including the user profile applications 112a-112n, are malicious or safe. To do this, each application installed on the mobile devices 104a-104n may be searched against the database 116 in the application identification server 106, where data may be stored enabling a determination regarding whether the application has been identified as malicious. The status (malicious or safe) of each application may also be stored in the database 118.

Once each of the mobile devices 104a-104n have been assigned to clusters and the applications stored on each have been identified as malicious or safe, one or more of the security applications 114a-114n and 120 may create a unique security model for each cluster and store each security model in the database 118. These security models may be created by correlating a set of features from each of the subset of mobile devices within each cluster. Once a security model is created for each cluster, the security model corresponding to each cluster may be applied to mobile devices within each cluster to determine a range of predictive information, including a likelihood of encountering malicious applications and the type of malicious applications likely to be encountered. By identifying a cluster to which a mobile device belongs, and applying the corresponding security model, threat prediction evaluations that are more reliable and accurate than security models that are created on the entire set of mobile devices 104a-104n can be performed and appropriate security actions can be implemented.

Modifications, additions, or omissions may be made to the system 100 without departing from the scope of the present disclosure. In some embodiments, the system 100 may include additional components similar to the components illustrated in FIG. 1 that each may be configured similarly to the components illustrated in FIG. 1. For example, in some embodiments, the security applications 114a-114n may perform all of the functions necessary to protect mobile devices from malicious application encounters, thus rendering the security application 120 superfluous. In other embodiments, the security application 120 may perform all of the functions necessary to protect mobile devices from malicious application encounters, thus rendering the security applications 114a-114n superfluous.

Alternatively still, the functions necessary to protect mobile devices from malicious application encounters may be split between the security applications 114a-114n on the mobile devices 104a-104n and the remote security application 120 on the security server. For example, the security applications 114a-114n may be responsible for identifying and sending data necessary for the security application 120 to create clusters and security models for each cluster. Once the clusters have been identified and corresponding security models created, a security application on a new mobile device may be responsible for evaluating data on the mobile device and determining to which cluster the mobile devices belongs. Once the appropriate cluster has been identified, the security application on the mobile device may pull and apply the security model associated with the cluster to detect threats, predict risky behaviors. An output of the security model may be used to provide personalized notifications and messages, and personalize AV parameters, such as a scan frequency and depth. The security application 120 may be responsible for continuous learning actions including feature refinement, profile and cluster refinement, and security model refinement.

Figure 2:
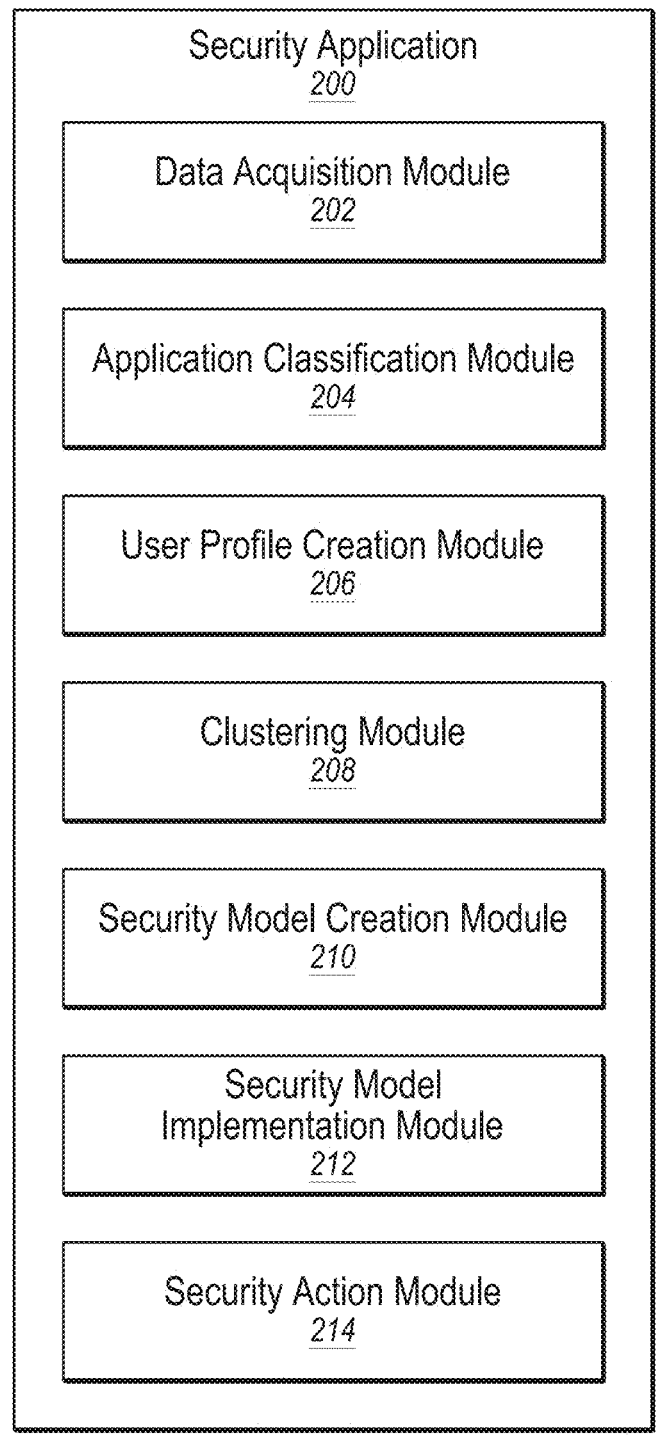
FIG. 2 illustrates an exemplary security application.

FIG. 2 illustrates an exemplary security application 200. The security application 200 may be, for example, one or more of the security applications 114a-114n and 120 illustrated in FIG. 1. The security application 200 includes a data acquisition module 202, an application classification module 204, a user profile creation module 206, a clustering module 208, a security model creation module 210, a security model implementation module 212, and a security action module 214.

In some embodiments the data acquisition module 202 may acquire data from one or more mobile devices, such as the mobile devices 104a-104n illustrated in FIG. 1. The data received by the acquisition module 202 may include data that identifies the applications installed on one or more user devices. In addition to an identification of the applications, the data acquisition module 202 may also obtain metadata associated with the applications installed on each mobile device. This metadata may be obtained from application installation logs, Android Package Kit (APK) files (for devices using an Android operating system), and similar files for devices using an Apple operating system. In some embodiments, the data received by the data acquisition module 202 may be limited to application metadata.

For example, for mobile devices that use an Android operating system, application metadata acquired by the data acquisition module 202 may include the APK hash, the APK package name, the signer (i.e., the SHA256 of the public key in the APK's certificate), and the name of the parent package that installed the APK. Parent information for some applications may also be obtained via Android's PackageInstaller class using the PackageInstaller.getInstallerPackageName method. Similar data may be obtained for applications installed on mobile devices that use another operating system, such as Apple devices. The data acquisition module 202 may further receive data that identifies a geographical location or locations from which the mobile devices operate.

As provided in more detail hereafter, the data received by the acquisition module 202 may include (1) application data that may be used to identify user profiles and classify mobile devices into appropriate clusters, and (2) feature data that may be used to develop a security model for each cluster created.

In some embodiments, this data may be obtained in a way that preserves the privacy of the users associated with the mobile devices. For example, this data may only be available from users that have opted in or provided necessary permissions to share this data. The identity of the users may also be anonymized in order to further preserve privacy.

In some embodiments the application classification module 204 may classify the applications installed on the one or more mobile devices, such as the mobile devices 104a-104n illustrated in FIG. 1. Specifically, the application classification module 204 may assign a classification to each application based on a category to which the application belongs. These categories may include, for example, communication, tools, productivity, entertainment, social, music and audio, shopping, finance, travel and local, video players, game, photography, news and magazines, lifestyle, maps and navigation, books and references, health and fitness, business, food and drink, education, personalization, weather, sports, medical, auto and vehicles, comics, house and home, libraries and demo, art and design, events, dating, parenting, and beauty.

The category to which an application belongs may be determined from data associated with the application. For example, the category to which an application belongs may be determined based on a title of the application or metadata associated with the application that identifies its category. The identified category of an application may be used to classify the application. In some embodiments, an application's classification may be the same as its category.

In addition to classifying the applications installed on the one or more mobile devices, the application classification module 204 may also identify applications as either malicious or safe. Malicious applications may include unwanted software components, such as malware grayware, adware, etc. To identify applications as either malicious or safe, the application classification module 204 may consult one or more databases that identify malicious applications, such as the application identification server 106 in FIG. 1. In some embodiments, a hash of application APKs may be queried in a database of a malicious application server such as VirusTotal®. This server may return file metadata and a list of detection labels assigned by a number of AV engines used to scan the file. These labels can be used to identify malicious applications. In some embodiments, the application may be required to be identified as malicious by at least a threshold number of AV engines. A higher threshold reduces false positives, but may increase false negatives. In some embodiments, a threshold value between 2 and 14 may be used. In one specific embodiment, a threshold of at least 4 AV engines may be used.

In some embodiments, the user profile creation module 206 may determine, based on the classifications of installed applications, user profiles for each of the one or more mobile devices, such as the mobile devices 104*a*-104*n* illustrated in FIG. 1. In some embodiments, the classifications of the applications may be used to determine a user profile for a mobile device.

However, in some embodiments, not all of the applications installed on a mobile device should be evaluated to determine an appropriate user profile. For example, applications that have not been installed on the mobile device by the user should not be used to characterize the user. These applications, which include operating system applications and pre-installed applications may already be present when the mobile device is acquired. Other applications may be downloaded without user intervention by system-level applications, for example, as part of firmware upgrades. Because the user did not originate the installation of these applications, their presence does not provide information about user interests, needs, or personality traits. Thus, in some embodiments, they are excluded from the user profile creation process.

However, identifying user-installed applications can be challenging. Operating system restrictions may prohibit applications from monitoring such events. System-level applications are often installed under a system partition (e.g., /system, /vendor, /oem), but the installation path may not be available. To address this issue, in some embodiments, applications evaluated to determine an appropriate user profile may include only those applications that are installed from an official or alternative markets (i.e., user-installed applications).

Once a group of applications installed on a user device is identified, the user profile creation module 206 may determine whether the mobile device exhibits sufficient interest in a category to associate this category with a user profile. In some embodiments, the user profile creation module 206 may identify a threshold number of applications installed on the mobile device to be within a selected percentile of all mobile devices installing applications from the category. For example, the user profile creation module 206 may require a mobile device to be in the top 10% of mobile devices that install applications from the game category to include this category as part of the user profile. Using this example, if 10.02% of all mobile devices have installed at least 13 applications in the game category, while 9% of all mobile devices have installed at least 14 applications in the game category, 14 installed applications in the game category would be the threshold for assignment of a user profile. This is because a mobile device with at least 14 games installed is in the top 10% of this category, while less than 14 games installed would not be put the mobile device in the top 10% of this category. Any threshold may be used for assignment of a mobile device to a user profile. In some embodiments it may be more than 10% and in other embodiments it may be less than 10%. In some embodiments, for the smallest categories, where the threshold would be a single installed application, the user profile creation module 206 may require at least two applications from the category, as a single application may be too sensitive to noise.

Once categories that meet or exceed the required threshold number of installed applications are identified for a mobile device, the user profile creation module 206 may assign a corresponding user profile to the mobile device. Some mobile devices may have only a single user profile assigned to the device (single category profiles), while in other mobile devices may have more than one user profile assigned (multi-category profiles). For example, a user profile for one mobile device may be games and finance, while a user profile for another mobile device may be finance alone.

In some embodiments, the clustering module 208 may assign mobile devices to different groups or clusters based on similarities in their user profiles. For example, all mobile devices that share the same single category profile may be assigned to the same cluster. Similarly, all mobile devices that share the same multi-category profile may be assigned to the same cluster. In some embodiments, the clustering module 208 may confirm that mobile devices are assigned to the correct cluster by verifying the Kullback-Leibler (K-L) distance among the mobile devices assigned to the same cluster.

In some embodiments, the clustering module 208 may not assign all mobile devices to a cluster. In some embodiments, filters may be applied for removing mobile devices that do not capture real user behavior. For example, devices used for tasks such as application testing or research, and mobile devices for which there is not enough information to capture the behavior of its user may be filtered out. Thus, the clustering module 208 may apply a minimum and maximum application number thresholds. Mobile devices that either exceed the maximum number of installed applications or fall below the minimum number of installed applications may be filtered out and not assigned to any cluster.

In some embodiments, the security model creation module 210 may generate a separate security model for each cluster created by the clustering module 208. The security model creation module 210 may generate a unique security model for each cluster based on data from the mobile devices within each cluster. The data used to generate a security model may be obtained by the data acquisition module 202.

To generate a security model for each cluster, the security model creation module 210 may extract and analyze a wide range of different features, which generally fall within 6 different features classes, from each of the mobile devices within a cluster. These feature classes may include volume, diversity, updates, distribution, prevalence, and geography. Any number of different features, some of which are described below, from each of these classes may be analyzed to create a security model for each cluster.

A number of different volume based features may be extracted, evaluated, and used to create the security model, as volume of online activity may be highly correlated with a number of malicious application encounters on mobile devices. These features may include a number of installed applications and the number of days that a mobile device is active. A risk of encountering a malicious application may increase as the number of installed applications on a mobile device and as the number of days that the mobile device is active also increase.

A number of different diversity based features may also be extracted, evaluated, and used to create the security model. In some embodiments, a number of application signers and a number of application categories on a mobile device may be analyzed. The number of application signers may represent a reliable risk indicator as users with applications belonging to a large number of publishers have a much higher probability of reporting malicious encounters compared to users that have installed applications from fewer publishers.

Update based features, or a frequency with which a user performs updates on a mobile device, may also be extracted, evaluated, and used to create the security model. In some embodiments, to measure this feature, a ratio between a number of distinct package (application) names and a number of APKs installed may be identified. A ratio of 1 indicates a single version for each application and a low update rate. On the other hand, a ratio that is close to 0 indicates maintenance of an up-to-date device with multiple versions for each application. In one embodiment, a high update rate may be indicated by a ratio of 0.25 or less. A low update rate may be indicated by a ratio of between 0.5 and 0.75 and a ratio that is more than 0.75 may indicate a very low update rate. A risk of encountering a malicious application may increase as the update ratio increases and as the update rate decreases.

A number of different distribution based features may also be extracted, evaluated, and used to create the security model. In some embodiments, a fraction of applications installed from alternative markets may be identified. More applications downloaded from alternative markets may increase a risk of encountering malicious applications. In addition, a number of alternative markets that are installed on a mobile device may be identified. A risk of encountering malicious applications may increase with the number of alternative markets installed on the mobile device.

Prevalence based features, or a number of devices on which the application is installed, may also be extracted, evaluated, and used to create the security model. Having a higher number of popular applications installed corresponds to a reduction in a risk of encountering malicious applications.

A number of different geography based features may also be extracted, evaluated, and used to create the security model. In some embodiments, a number of countries each mobile device connects from and a continent from which the mobile device connects may be identified. An increase in the number of countries a user connects from may increase a risk of encountering malicious applications. In addition, some threats are specific to certain countries. Thus, identifying the countries from which a mobile device connects may identify an increased risk of encountering specific malicious applications. Further, a risk of encountering malicious applications may increase based on a continent from which the mobile device connects. For example, mobile devices that connect from Africa and South America may have higher risks of encountering malicious applications than mobile devices that connect from other continents. On the other hand, mobile devices that connect from Oceania, North America, and Europe, may have a lower risk of encountering malicious applications.

Once these features are extracted, one or more Generalized Linear Models (GLMs) may be used to correlate the features to a likelihood of encountering malicious applications. Each of the one or more GLMs may model feature variables by using a binomial distribution and a logarithmic link function. Each model may capture an outcome of detecting (1) any malicious app (i.e., malware or PUA), (2) only malware, and (3) only PUA. Once fitted to the data, each model may output a Log-Odds distribution for the dependent variable Y that expresses the odds of a malicious encounter as a linear combination of the different features evaluated. The extent to which each feature influences a malicious encounter is captured by its regression coefficient. Granularity may be reduced by bucketing each feature into quartiles (i.e., 4 bins). A first bin may be set as reference, and the odds ratios of other bins may be expressed with respect to the reference.

To select a model, different GLM configurations may be tested and the outcomes of several goodness-of-fit quantities (Pseudo R-Squared, Log-Likelihood, Dispersion) may be analyzed in addition to controlling for feature dimensionality by employing the Akaike Information Criterion (AIC). In addition, an analysis may be conducted to evaluate how the identified factors differ between the best and worst devices (i.e., clean mobile devices exhibiting no signs of malicious applications and outlier mobile devices that report a very high number of malicious applications).

In some embodiments, the security model implementation module 212 may implement the security model to a mobile device assigned to the cluster corresponding to the security model. An output of the model can be used to identify a risk level of the mobile device and predict when the mobile device is going towards a risky profile, thus enabling personalized actions according to the level of risk the user of the mobile device is facing.

In some embodiments, the security action module 214 may identify appropriate response based on the outcome of an implementation of a security model. For example, in some embodiments, the security action may suggest or automatically set sensible AV default settings. In another embodiment, the security action may proactively increase or reduce a scan frequency (e.g., daily, weekly) or scan level intensity (e.g., quick, deep) of an AV solution operating on the mobile device. If the risk level is high, the scan frequency may be increased and the scan may be comprehensive. Alternatively, if the risk level is low, the scan frequency may be decreased and the scan may be less comprehensive. In another embodiment, the security action may include crafting custom notifications and warnings displayed on mobile devices with the aim of raising user awareness of risks and correcting their behaviors.

By implementing a personalized security model, risk predictions for mobile devices can be determined and users who exhibit a riskier profile may be proactively warned before any actual threat materializes. The risk predictions determined using security models created as described herein may be much more reliable and accurate than risk predictions created by one-size-fits-all security models that are created using a general class of mobile devices. This is because the security models described herein are individually tailored based on the interests, needs, and personality traits of the users associated with each mobile device.

Modifications, additions, or omissions may be made to the security application 200 without departing from the scope of the present disclosure. For example, the security application 200 may include additional components similar to the components illustrated in FIG. 2 that each may be configured similarly to the components illustrated in FIG. 2. Further, in some embodiments, the functionality of the security application 200 may be spread across two or more separate security applications. For example, in some embodiments, a security application that performs some of the functions of the security application 200 may be installed on a mobile device while a security application that performs other functions of the security application 200 may be installed on a security server that is remote from mobile devices.

Figure 3A:
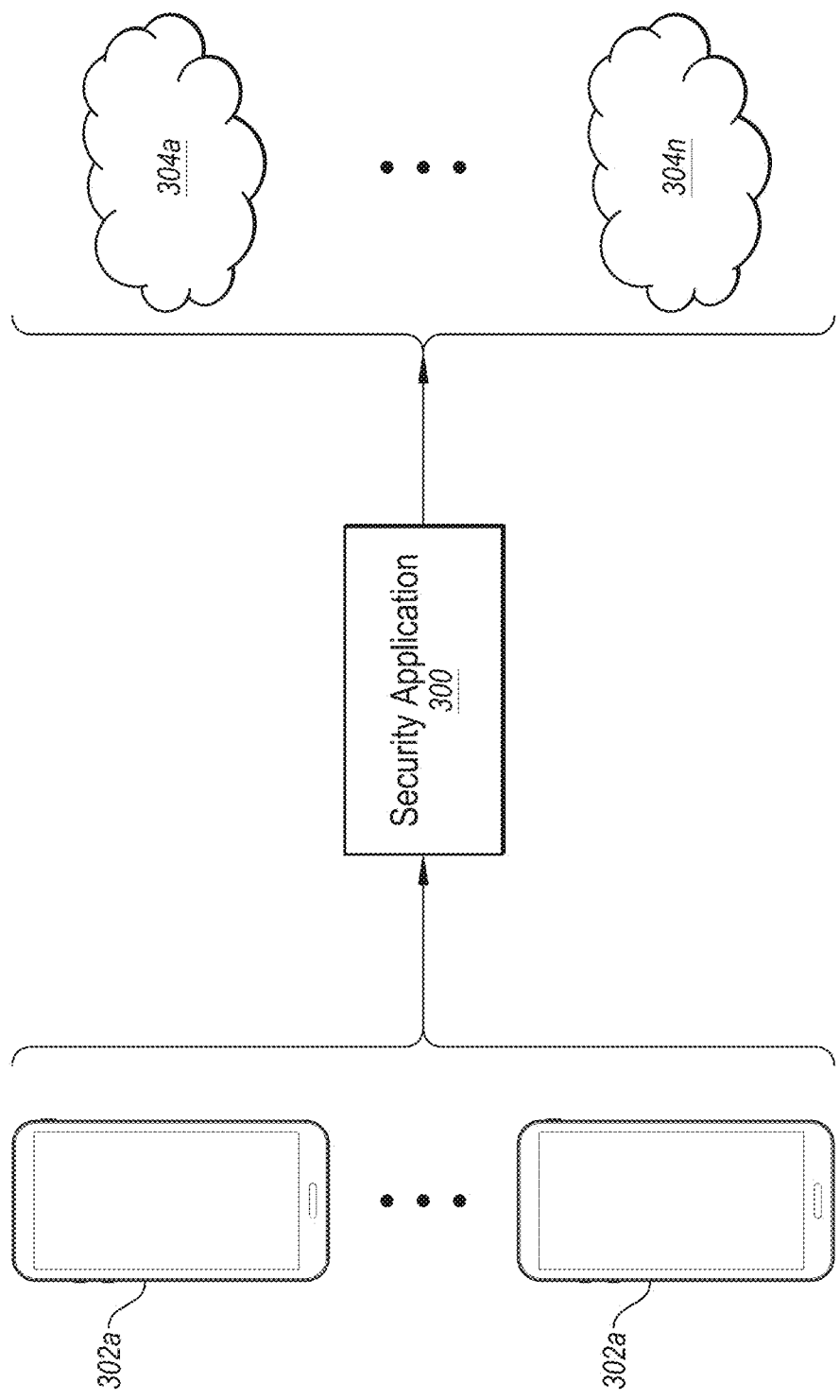
Figure 3B:
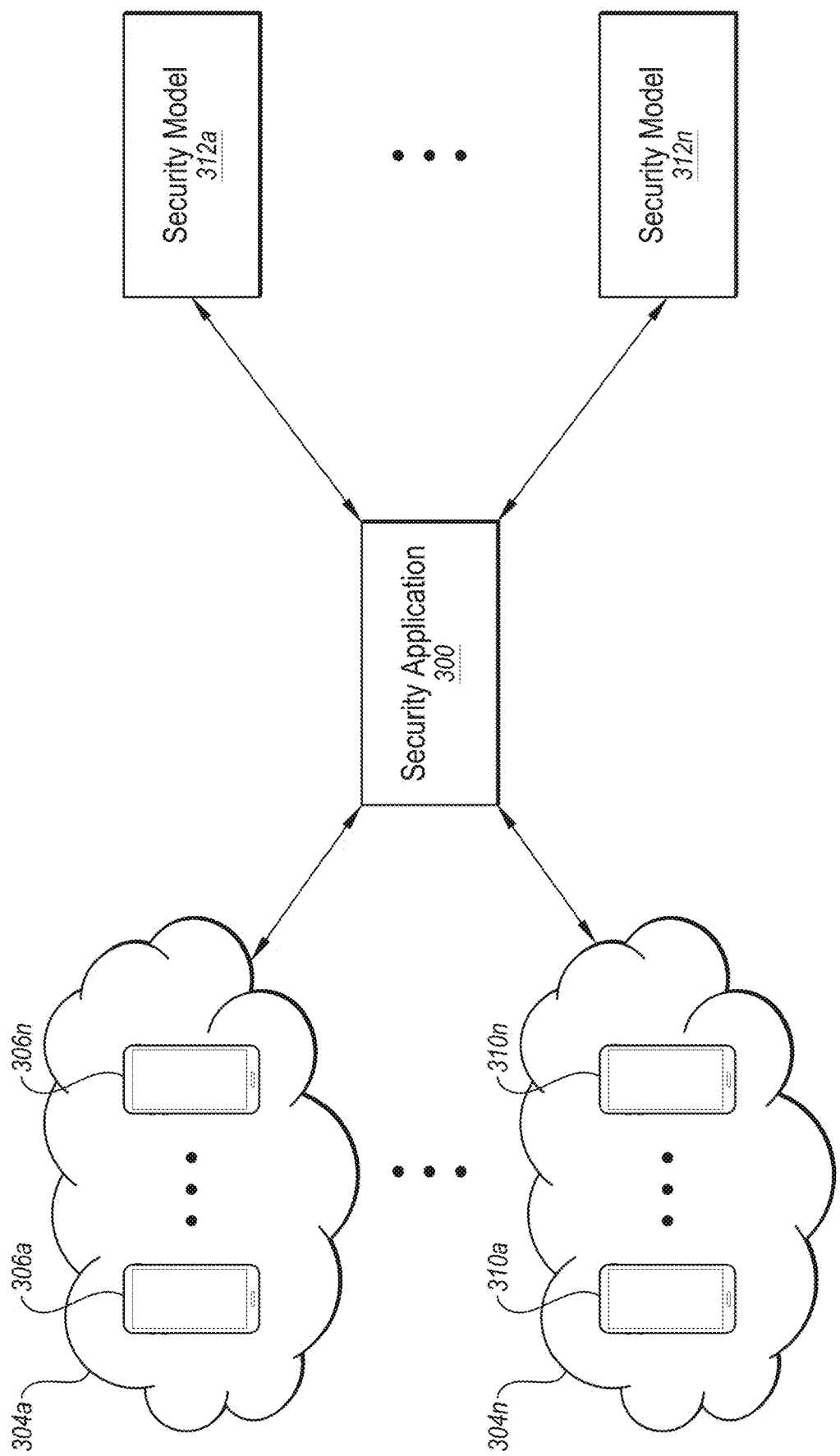

FIGS. 3A-3C illustrate different stages of actions performed by a security application in a system for protecting mobile devices from malicious application encounters. The security application 300, illustrated in FIG. 3A may be any of the security applications 114a-114n in FIG. 1 or the security application 200 in FIG. 2.

In FIG. 3A, the security application 300 is receiving data from a plurality of mobile devices 302a-302n. As described above, the data received by the security application 300 may be used to identify a user profile for each of the mobile devices 302a-302n and, based on the user profile identified, place each of the mobile devices 302a-302n into one of a plurality of clusters 304a-304n. The security application 300 may receive an identification of the applications installed on each of the mobile devices 302a-302n and determine a category of each application. The security application may generate a user profile for each of the mobile devices 302a-302n based on a number of applications within the same category that are installed on each of the mobile devices 302a-302n. In some embodiments, and depending on the applications installed, the security application may generate a user profile based on a single category. For example, the security application 300 may identify for one of the mobile devices a comics user profile. In another embodiment, the security application 300 may identify for one of the mobile devices a comics and sports user profile.

The profiles determined for each of the mobile devices 302a-302n may be used to assign each of the mobile devices 302a-302n to clusters. In some embodiments, the clusters may be consistent with the user profile categories assigned to each of the mobile devices 302a-302n. Thus, there may be a cluster for mobile devices having a comics user profile, another cluster for a sports user profile, another cluster for a comics and sports user profile, and so on.

The data received may also be used to create unique security models for each cluster created. This data may include data from different feature classes that include, but are not necessarily limited to, volume, diversity, updates, distribution, prevalence, and geography. Data received relating to volume may include a total number of applications installed on a mobile device, and/or a number of days that the mobile device is active. Data received relating to diversity may include a number of application signers for the installed applications and/or a number of application categories into which the installed applications fall. Data received relating to updates may include a number of distinct package (application) names and a number of APKs installed. Data received relating to distribution may include information relating to how many applications installed on a mobile device were installed from an alternative market and/or how many alternative markets are installed on the mobile device. Data received relating to prevalence may include a total number of installations of each application on mobile devices (i.e., the popularity of the application). Data received relating to geography may include a number of countries that each mobile device connects from and/or the continent from which each mobile device connects.

In FIG. 3B, the security application 300 may create, based on data received from the mobile devices in each cluster, a security model 312a-312n for each cluster. As can be seen in FIG. 3B, each of the clusters 304a-304n include a subset of mobile devices from the plurality of mobile devices 302a-302n. Specifically, the cluster 304a includes mobile devices 306a-306n while the cluster 304n includes mobile devices 310a-310n. To create a security model 312a-312n for each cluster, the security application 300 may analyze data that is unique to the devices in each cluster.

For example, to create the security model 312a, which corresponds to the cluster 304a, the security application 300 may evaluate the data in the feature classes from the mobile devices 306a-306n and correlate this data with different risk profiles. One or more GLMs may be used to correlate this data and determine different types of risks commonly encountered by mobile devices in each cluster. These different types of risks may include a likelihood of encountering any malicious applications, the types of malicious applications likely to be encountered including an identification of a specific type of malware likely to be encountered, how the threats present themselves, etc.

Once a unique security model is created for each cluster, the security application 300 may apply this model to mobile devices. In FIG. 3C, a mobile device 314 provides data to the security application 300. This data may include an identification of the applications installed on the mobile device 314 and a category of each application. From this data, the security application 300 may identify a user profile from the mobile device 314 and determine that the mobile device 314 belongs to a cluster 304b. The security application 300 may then identify a security model 312b, which corresponds to the cluster 304b, and apply it to the mobile device 314. Based on an output of the security model, the security application 300 may identify one or more security actions to perform to protect the mobile device 314 from risk.

Additional data, including feature data, may be obtained from the mobile device 314. The security application 300 may use this data to further refine the boundaries of the cluster 314b and the security model 312b. Thus, as the security application 300 applies appropriate security models to new and unknown mobile devices, data from these mobile devices may be obtained and used to further improve the risk predictions and other outputs of the security models.

Figure 4A:
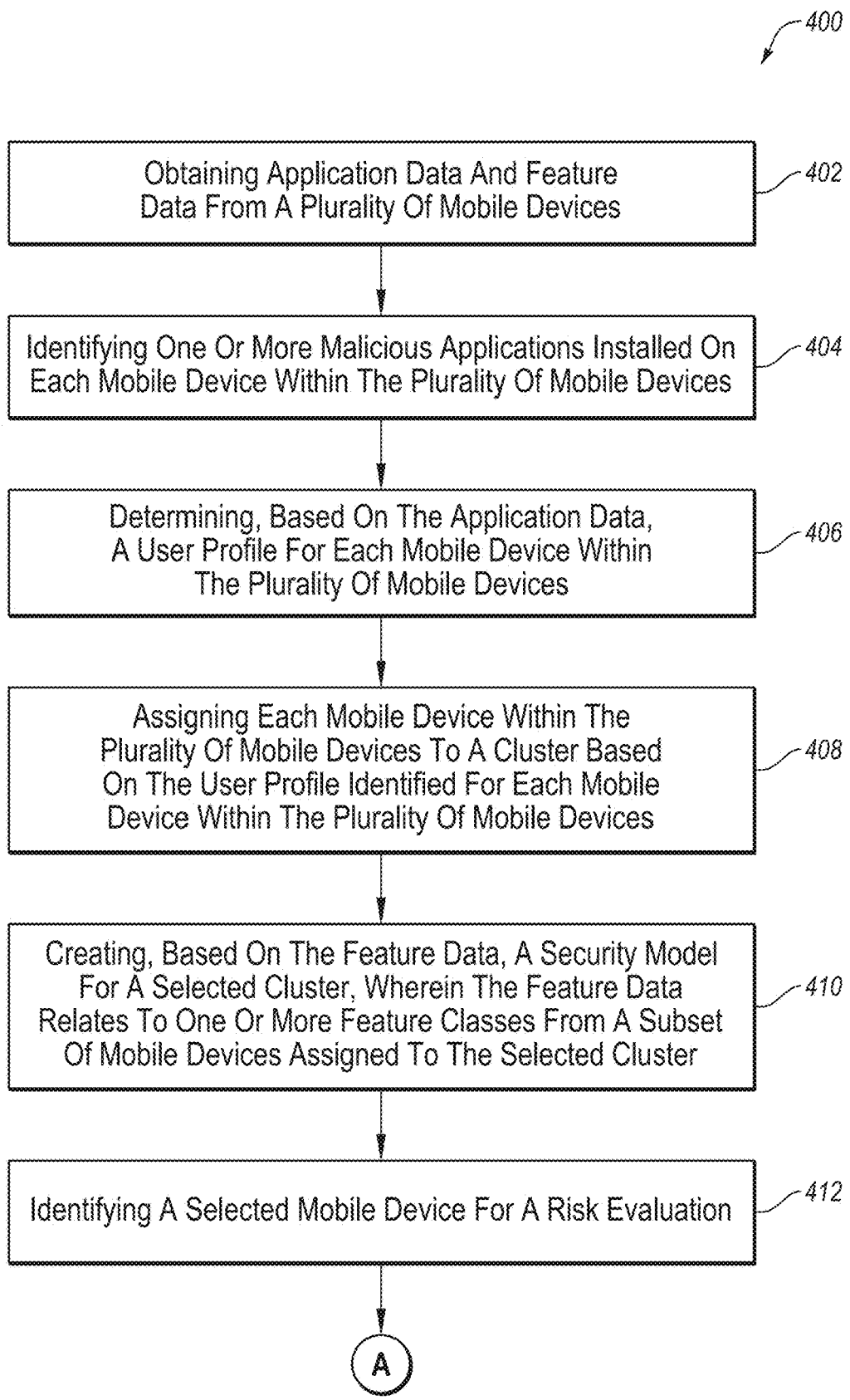
FIGS. 4A and 4B illustrate a flowchart of an example method for protecting mobile devices from malicious application encounters.
Figure 4B:
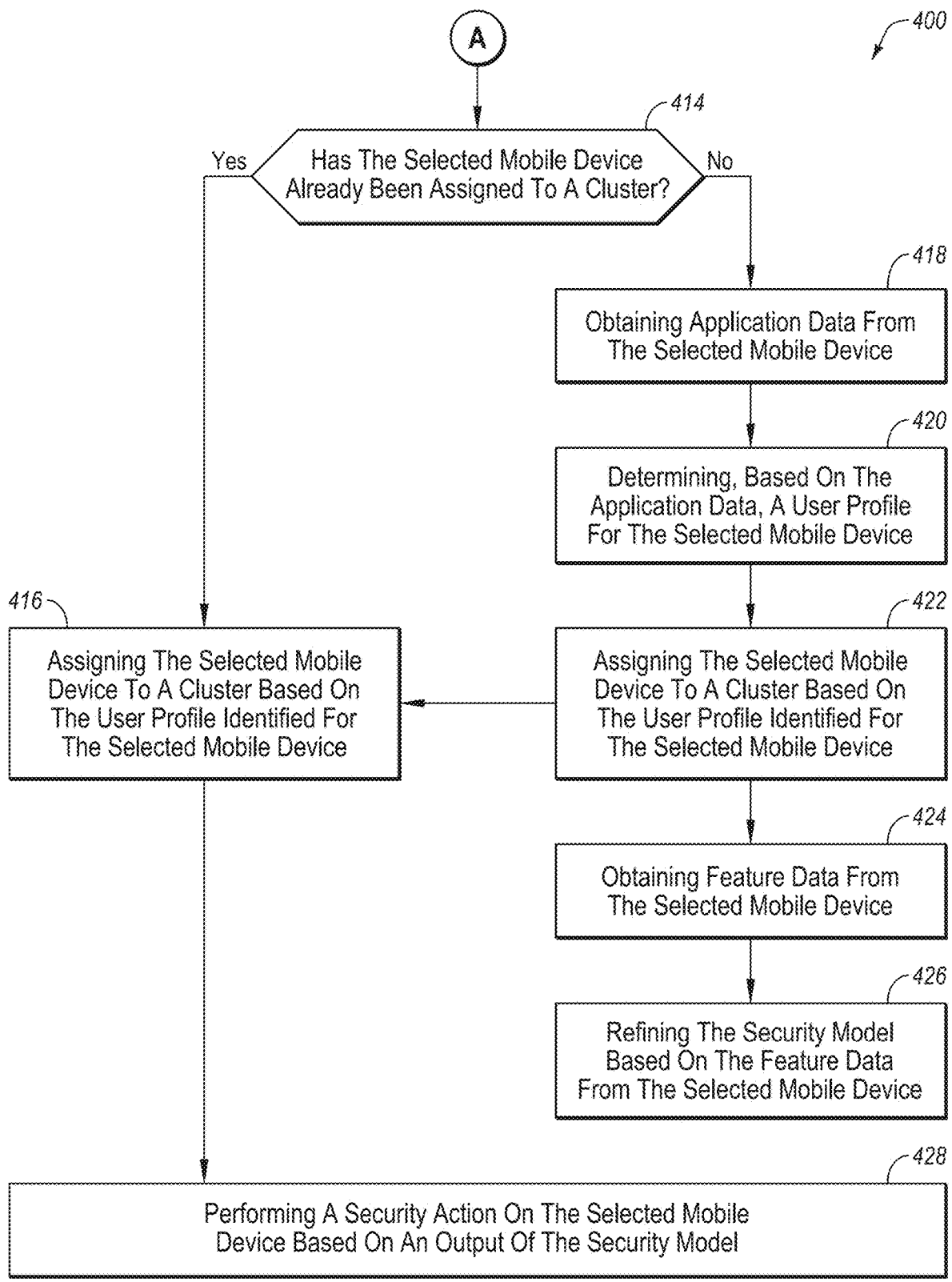

FIGS. 4A-4B are a flowchart of an example method 400 for protecting mobile devices from malicious application encounters. The method 400 may be performed, in some embodiments, by a device or system, such as by one or more of the security applications 114a-114n and 120 illustrated in FIG. 1, the security application 200 in FIG. 2, or the security application 300 in FIG. 3. In these and other embodiments, the method 400 may be performed by one or more processors based on one or more computer-readable instructions stored on one or more non-transitory computer-readable media.

The method 400 may include, at action 402, obtaining application data and feature data from a plurality of mobile devices. For example, a list of applications installed on mobile devices may be obtained as well as metadata associated with the applications. Data regarding a geographic location from which the mobile devices are used may also be obtained. The application data may include the identity of the applications installed and a category of each application. This data may be used to identify user profiles for each of the mobile devices and to cluster the mobile devices into appropriate groups. The feature data may be used to create a security model for each cluster.

The feature data may include features from one or more feature classes, including volume, diversity, updates, distribution, prevalence, and/or geography. For example, features within a volume class may relate to a volume of online activity by each of the mobile devices. Features within a diversity class may relate to a diversity of online behaviors by each of the mobile devices. Features within an updates class may relate to a frequency of software updates performed by each of the mobile devices. Features within a distribution class may relate to a distribution of application signers or application categories by each of the mobile devices. Features within a prevalence class may relate to a prevalence of applications installed by each of the mobile devices. Features within a geography class may relate to a geographical location of each of the mobile devices.

The method 400 may include, at action 404, identifying one or more malicious applications installed on each mobile device within the plurality of mobile devices. For example, existing databases that analyze applications and identify malicious applications may be used to identify the applications as malicious. Malicious applications may include applications that install malware and other potentially unwanted applications (PUAs). In some embodiments, a threshold number of different existing identification solutions that identify applications as malicious may be required in order to conclude that an application is malicious. For example, in some embodiments, 4 different existing identification solutions may be required to determine that an application is malicious.

The method 400 may include, at action 406, determining, based on the application data, a user profile for each mobile device within the plurality of mobile devices. In some embodiments, the user profile may be identified based on a category associated with applications installed on individual mobile devices. These categories may include, but are not necessarily limited to, communication, tools, productivity, entertainment, social, music and audio, shopping, finance, travel and local, video players, game, photography, news and magazines, lifestyle, maps and navigation, books and references, health and fitness, business, food and drink, education, personalization, weather, sports, medical, auto and vehicles, comics, house and home, libraries and demo, art and design, events, dating, parenting, and beauty. In some embodiments, a mobile device may be assigned a user profile that includes only a single category. In other embodiments, a mobile device may be assigned a user profile that includes multiple categories.

To be assigned a user profile, some threshold level of interest may be required before an application category is associated with a user profile. For example, in some embodiments, for a category to be associated with a user profile, a certain number of applications within the category may be required to be installed on the mobile device. In some embodiments, the mobile device may be required to be in a threshold percentile, such as the top 10%, of mobile devices having applications from the category installed. For some categories, to be in a threshold percentile may require 4 or 5 or more application in the category installed. For other categories, a single application within the category may be required to be within a threshold percentile. In order to avoid inaccuracies due to noise, mobile devices may be required to have installed at least 2 applications from a category for a user profile to be associated with the category.

The method 400 may include, at action 408, assigning each mobile device within the plurality of mobile devices to a cluster based on the user profile identified for each mobile device within the plurality of mobile devices. In some embodiments, the clusters may be consistent with the categories of applications and the user profiles identified. For example, the clusters may be based on one or more of the application categories, which include but are not necessarily limited to, communication, tools, productivity, entertainment, social, music and audio, shopping, finance, travel and local, video players, game, photography, news and magazines, lifestyle, maps and navigation, books and references, health and fitness, business, food and drink, education, personalization, weather, sports, medical, auto and vehicles, comics, house and home, libraries and demo, art and design, events, dating, parenting, and beauty. Some clusters may include mobile devices that are associated with a single category while other clusters may include mobile devices that are associated with multiple categories.

The method 400 may include, at action 410, creating, based on the feature data, a security model for a selected cluster, wherein the feature data relates to one or more feature classes from a subset of mobile devices assigned to the selected cluster. For example, to create a security model for a selected cluster, feature data from the devices within the cluster may be evaluated. Features, extracted from this feature data and from within the feature classes identified above, may be analyzed. For example, features within a volume class may relate to a volume of online activity by each of the mobile devices. Features within a diversity class may relate to a diversity of online behaviors by each of the mobile devices. Features within an updates class may relate to a frequency of software updates performed by each of the mobile devices. Features within a distribution class may relate to a distribution of application signers or application categories by each of the mobile devices. Features within a prevalence class may relate to a prevalence of applications installed by each of the mobile devices. Features within a geography class may relate to a geographical location of each of the mobile devices.

The method 400 may include, at action 412, identifying a selected mobile device for a risk evaluation. The selected mobile device may be a mobile device that has already been evaluated, associated with a user profile, and assigned to a cluster. Alternatively, the mobile device may be a new device that is unknown.

The method 400 may include, at action 414, determining whether the selected mobile device has already been assigned to a cluster. If the selected mobile device has already been assigned to a cluster, the method 400 may include, at action 416, applying the security model corresponding to the assigned cluster to the selected mobile device. An output of the model can be used to identify a risk level of the selected mobile device and predict when the selected mobile device is going towards a risky profile, thus enabling personalized actions according to the level of risk the user of the selected mobile device is facing.

The method 400 may include, at action 428, performing a security action on the selected mobile device based on the output of the security model. For example, in some embodiments, the security action may suggest or automatically set sensible AV default settings. In another embodiment, the security action may proactively increase or reduce a scan frequency (e.g., daily, weekly) or scan level intensity (e.g., quick, deep) of an AV solution operating on the mobile device. If the risk level is high, the scan frequency may be increased and the scan may be comprehensive. Alternatively, if the risk level is low, the scan frequency may be decreased and the scan may be less comprehensive. In another embodiment, the security action may include crafting custom notifications and warnings displayed on mobile devices with the aim of raising user awareness of risks and correcting their behaviors.

If the selected mobile device has not already been assigned to a cluster, the method 400 may include, at action 418, obtaining application data from the selected mobile device. This application data may be consistent with the application data obtained from the plurality of mobile devices in step 402. Once application data has been obtained from the selected mobile device, the method 400 may include, at action 420, determining a user profile for the selected mobile device. This action may be consistent with the process for determining user profiles in step 406. Once a user profile has been identified for the selected mobile device, the method 400 may include, at action 422, assigning the selected mobile device to a cluster. This action may be consistent with the process for assignment of mobile devices to clusters in step 408. Once the selected mobile device has been assigned to a cluster, the method 400 may proceed back to action 416, where the security model corresponding to the assigned cluster is applied to the selected mobile device and, at action 428, performing a security action on the selected mobile device based on an output of the security model and a security action may be taken at action 428.

In embodiments where the selected mobile device has not been assigned to a cluster, the method may further include, at action 424, obtaining feature data from the selected mobile device. This feature data may be consistent with the feature data obtained from the plurality of mobile devices in step 402. The method 400 may include, at action 426, refining the security model based on the feature data obtained from the selected mobile device at action 426.

The method 400 may thus be employed, in some embodiments, to categorize mobile devices into clusters based on similarities in user profiles. Different security models for each cluster are created for each cluster and applied to mobile devices within the cluster. By personalizing the security model applied, accuracy and reliability of threat predictions can be dramatically improved compared to one-size-fits-all security models.

Although the actions of the method 400 are illustrated in FIGS. 4A-4B as discrete actions, various actions may be divided into additional actions, combined into fewer actions, reordered, expanded, or eliminated, depending on the desired implementation. Further, it is understood that the method 400 may improve the functioning of a computer system itself. For example, the functioning of a mobile device, such as one of the mobile devices 104a-104n of FIG. 1, or the mobile device 314 of FIG. 3, may be improved by the method 400. For example, functionality of these devices may be improved by the method 400 by creating a more personalized security model that can be applied to one or more of these mobile devices. As provided above, output of the security model can be used to identify a risk level of the selected mobile device and predict when the selected mobile device is going towards a risky profile, thus enabling personalized actions according to the level of risk the user of the selected mobile device is facing. Once this risk assessment is performed, one or more security actions may be taken to protect the mobile device from anticipated malicious application encounters.

Also, the method 400 may improve the technical field of mobile device risk assessments. Creating a security model that is tailored to the interests exhibited by mobile device users significantly improves the accuracy and reliability of threat predictions compared to one-size-fits-all security models, which do not account for differences in interests of mobile device users.

FIG. 5 illustrates an example computer system 500 that may be employed in protecting mobile devices from malicious application encounters. In some embodiments, the computer system 500 may be part of any of the systems or devices described in this disclosure. For example, the computer system 500 may be part of any of the client devices 104a-104n, the application identification server 106, and the security server 108 of FIG. 1.

The computer system 500 may include a processor 502, a memory 504, a file system 506, a communication unit 508, an operating system 510, a user interface 512, and an application 514, which all may be communicatively coupled. In some embodiments, the computer system may be, for example, a desktop computer, a client computer, a server computer, a mobile phone, a laptop computer, a smartphone, a smartwatch, a tablet computer, a portable music player, a networking device, or any other computer system.

Generally, the processor 502 may include any suitable special-purpose or general-purpose computer, computing entity, or processing device including various computer hardware or software applications and may be configured to execute instructions stored on any applicable computer-readable storage media. For example, the processor 502 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 502 may interpret and/or execute program instructions and/or process data stored in the memory 504 and/or the file system 506. In some embodiments, the processor 502 may fetch program instructions from the file system 506 and load the program instructions into the memory 504. After the program instructions are loaded into the memory 504, the processor 502 may execute the program instructions. In some embodiments, the instructions may include the processor 502 performing one or more of the actions of the methods disclosed herein.

The memory 504 and the file system 506 may include computer-readable storage media for carrying or having stored thereon computer-executable instructions or data structures. Such computer-readable storage media may be any available non-transitory media that may be accessed by a general-purpose or special-purpose computer, such as the processor 502. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 502 to perform a certain operation or group of operations, such as one or more of the actions of the methods disclosed herein. These computer-executable instructions may be included, for example, in the operating system 510, in one or more applications, such as the security applications 114a-114n and 120 of FIG. 1 and the security application 200 of FIG. 2.

The communication unit 508 may include any component, device, system, or combination thereof configured to transmit or receive information over a network, such as the network 102 of FIG. 1. In some embodiments, the communication unit 508 may communicate with other devices at other locations, the same location, or even other components within the same system. For example, the communication unit 508 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 508 may permit data to be exchanged with a network and/or any other devices or systems, such as those described in the present disclosure.

The operating system 510 may be configured to manage hardware and software resources of the computer system 500 and configured to provide common services for the computer system 500.

The user interface 512 may include any device configured to allow a user to interface with the computer system 500. For example, the user interface 512 may include a display, such as an LCD, LED, or other display, that is configured to present video, text, application user interfaces, and other data as directed by the processor 502. The user interface 512 may further include a mouse, a track pad, a keyboard, a touchscreen, volume controls, other buttons, a speaker, a microphone, a camera, any peripheral device, or other input or output device. The user interface 512 may receive input from a user and provide the input to the processor 502. Similarly, the user interface 512 may present output to a user.

The application 514 may be one or more computer-readable instructions stored on one or more non-transitory computer-readable media, such as the memory 504 or the file system 506, that, when executed by the processor 502, is configured to perform one or more of the actions of the methods disclosed herein. In some embodiments, the application 514 may be part of the operating system 510 or may be part of an application of the computer system 500, or may be some combination thereof. In some embodiments, the application 514 may function as any one of the security applications 114a-114n and 120 of FIG. 1 and the security application 200 of FIG. 2.

Modifications, additions, or omissions may be made to the computer system 500 without departing from the scope of the present disclosure. For example, although each is illustrated as a single component in FIG. 5, any of the components 502-514 of the computer system 500 may include multiple similar components that function collectively and are communicatively coupled. Further, although illustrated as a single computer system, it is understood that the computer system 500 may include multiple physical or virtual computer systems that are networked together, such as in a cloud computing environment, a multitenancy environment, or a virtualization environment.

As indicated above, the embodiments described herein may include the use of a special purpose or general-purpose computer (e.g., the processor 502 of FIG. 5) including various computer hardware or software applications, as discussed in greater detail below. Further, as indicated above, embodiments described herein may be implemented using computer-readable media (e.g., the memory 504 or file system 506 of FIG. 5) for carrying or having computer-executable instructions or data structures stored thereon.

In some embodiments, the different components and applications described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absent a showing that the terms "first," "second," "third," etc., connote a specific order, these terms should not be understood to connote a specific order. Furthermore, absent a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for protecting against malicious application encounters, at least a portion of the method being performed by a computing device comprising one or more processors, the method comprising:
    obtaining application data and feature data from a plurality of mobile devices;
    identifying one or more malicious applications installed on each mobile device within the plurality of mobile devices;
    determining, based on the application data, a user profile for each mobile device within the plurality of mobile devices;
    assigning each mobile device within the plurality of mobile devices to a cluster based on the user profile identified for each mobile device within the plurality of mobile devices such that each cluster includes a subset of mobile devices from the plurality of mobile devices;
    creating, based on the feature data, a security model for a particular cluster, wherein the feature data relates to a distribution of application signers or application categories by each mobile device within the subset of mobile devices and one or more feature classes from a subset of mobile devices from the plurality of mobile devices that are assigned to the particular cluster, the one or more feature classes including volume, diversity, updates, distribution, prevalence, or geography;
    applying the security model to a selected mobile device from the plurality of mobile devices that is within the particular cluster; and
    performing a security action on the selected mobile device based on an output of the security model.

2. The method of claim 1, wherein the application data includes an identification of the applications installed on each mobile device within the plurality of mobile devices.

3. The method of claim 1, wherein malicious applications include applications that install malware.

4. The method of claim 1, wherein the feature data also relates to a volume of online activity by each mobile device within the subset of mobile devices.

5. The method of claim 1, wherein the feature data also relates to a diversity of online behaviors by each mobile device within the subset of mobile devices.

6. The method of claim 1, wherein the feature data also relates to a number or frequency of software updates performed by each mobile device within the subset of mobile devices.

7. The method of claim 1, wherein the feature data also relates to a prevalence of applications installed by each mobile device within the subset of mobile devices.

8. The method of claim 1, wherein the feature data also relates to a geographical location of each mobile device within the subset of mobile devices.

9. The method of claim 1, wherein the security action includes providing recommendations for antivirus default settings on the selected mobile device.

10. The method of claim 1, wherein the security action includes automatically adjusting antivirus default settings on the selected mobile device.

11. The method of claim 1, wherein the security action includes increasing a scan level intensity on the selected mobile device.

12. A computer-implemented method for protecting against malicious application encounters, at least a portion of the method being performed by a computing device comprising one or more processors, the method comprising:
    obtaining application data and feature data from a plurality of mobile devices;
    identifying one or more malicious applications installed on each mobile device within the plurality of mobile devices;
    determining, based on the application data, a user profile for each mobile device within the plurality of mobile devices;
    assigning each mobile device within the plurality of mobile devices to a cluster based on the user profile identified for each mobile device within the plurality of mobile devices such that each cluster includes a subset of mobile devices from the plurality of mobile devices;
    creating, based on the feature data, a security model for a particular cluster, wherein the feature data relates to a prevalence of applications installed by each mobile device within the subset of mobile devices and one or more feature classes from a subset of mobile devices from the plurality of mobile devices that are assigned to the particular cluster, the one or more feature classes including volume, diversity, updates, distribution, prevalence, or geography;
    applying the security model to a selected mobile device from the plurality of mobile devices that is within the particular cluster; and
    performing a security action on the selected mobile device based on an output of the security model.

13. The method of claim 12, wherein the application data includes an identification of the applications installed on each mobile divide within the plurality of mobile devices.

14. The method of claim 12, wherein the feature data also relates to a diversity of online behaviors by each mobile device within the subset of mobile devices.

15. The method of claim 12, wherein the feature data also relates to a number or frequency of software updates performed by each mobile device within the subset of mobile devices.

16. The method of claim 12, wherein the feature data also relates to a prevalence of applications installed by each mobile device within the subset of mobile devices.

17. The method of claim 12, wherein the feature data also relates to a geographical location of each mobile device within the subset of mobile devices.

18. The method of claim 12, wherein the security action includes providing recommendations for antivirus default settings on the selected mobile device or automatically adjusting antivirus default settings on the selected mobile device.

19. The method of claim 12, wherein the security action includes increasing a scan level intensity on the selected mobile device.

20. A computing device comprising:
one or more processors; and
one or more non-transitory computer-readable media comprising one or more computer-readable instructions that, when executed by the one or more processors, cause the computing device to perform a method for protecting against malicious application encounters, the method comprising:
obtaining application data and feature data from a plurality of mobile devices;
identifying one or more malicious applications installed on each mobile device within the plurality of mobile devices;
determining, based on the application data, a user profile for each mobile device within the plurality of mobile devices;
assigning each mobile device within the plurality of mobile devices to a cluster based on the user profile identified for each mobile device within the plurality of mobile devices such that each cluster includes a subset of mobile devices from the plurality of mobile devices;
creating, based on the feature data, a security model for a particular cluster, wherein the feature data relates to a distribution of application signers or application categories by each mobile device within the subset of mobile devices or a prevalence of applications installed by each mobile device within the subset of mobile devices and one or more feature classes from a subset of mobile devices from the plurality of mobile devices that are assigned to the particular cluster, the one or more feature classes including volume, diversity, updates, distribution, prevalence, or geography;
applying the security model to a selected mobile device form the plurality of mobile devices that is within the particular cluster; and
performing a security action on the selected mobile device based on an output of the security model.

* * * * *